United States Patent
Phadke et al.

(10) Patent No.: US 10,904,276 B2
(45) Date of Patent: Jan. 26, 2021

(54) SYSTEMS AND METHODS FOR ANOMALY DETECTION

(71) Applicant: Nokia Technologies Oy, Espoo (FI)

(72) Inventors: Chitra Phadke, Basking Ridge, NJ (US); Huseyin Uzunalioglu, Millington, NJ (US); Jin Cao, Berkeley Heights, NJ (US)

(73) Assignee: Nokia Technologies OY, Espoo (FI)

( * ) Notice: Subject to any disclaimer, the term of this patent is extended or adjusted under 35 U.S.C. 154(b) by 155 days.

(21) Appl. No.: 15/704,394

(22) Filed: Sep. 14, 2017

(65) Prior Publication Data
US 2019/0081969 A1  Mar. 14, 2019

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *H04L 29/06* | (2006.01) | |
| *G06F 21/55* | (2013.01) | |
| *G06K 9/62* | (2006.01) | |
| *H04L 12/26* | (2006.01) | |

(52) U.S. Cl.
CPC ........ *H04L 63/1425* (2013.01); *G06F 21/552* (2013.01); *G06K 9/6267* (2013.01); *H04L 63/1416* (2013.01); *H04L 43/062* (2013.01)

(58) Field of Classification Search
CPC .................................................. G06F 21/552
USPC .......................................................... 726/23
See application file for complete search history.

(56) References Cited

U.S. PATENT DOCUMENTS

| | | |
|---|---|---|
| 7,574,382 B1 | 8/2009 | Hubert |
| 9,053,391 B2 | 6/2015 | Wang et al. |
| 2011/0154119 A1* | 6/2011 | Wang .................. H04L 41/0631 714/37 |

(Continued)

FOREIGN PATENT DOCUMENTS

WO      2012140601 A1     10/2012

OTHER PUBLICATIONS

Mayank Pal Singh, "Quantifying Concept Drifting in Network Traffic Using ROC Curves From Naive Bayes Classifiers", 2013 Nirma University International Conference on Engineering—2013 IEEE—5 pages.

(Continued)

*Primary Examiner* — Wasika Nipa
*Assistant Examiner* — Samuel Ambaye
(74) *Attorney, Agent, or Firm* — Duft & Bornsen, PC (57) ABSTRACT

The present disclosure describes systems and methods that provide a hybrid framework for augmenting statistical anomaly detection with contextual features, machine learning and human Subject Matter Expert (SME) input to learn significant characteristics of true anomalies for which alerts should be generated. The framework presented herein is domain agnostic and independent of the underlying statistical anomaly detection technique or the machine learning algorithm. The framework described herein is therefore applicable and adaptable to a number of real world service provider systems and applications, such as, for example, detecting network performance degradation in a service provider network or detecting anomalous conditions from data received from a sensor while filtering out false positives.

19 Claims, 3 Drawing Sheets

(56) References Cited

U.S. PATENT DOCUMENTS

| | | |
|---|---|---|
| 2015/0033086 A1 | 1/2015 | Sasturkar et al. |
| 2015/0319185 A1* | 11/2015 | Kirti .................. H04L 63/1416 |
| | | 726/23 |
| 2015/0370682 A1 | 12/2015 | Grigoryan et al. |
| 2016/0042287 A1 | 2/2016 | Eldardiry et al. |
| 2017/0063888 A1* | 3/2017 | Muddu .................. H04L 41/22 |
| 2017/0242148 A1 | 8/2017 | Yu et al. |

OTHER PUBLICATIONS

International Search Report; Application PCT/US2018/049546; dated Nov. 15, 2018.

* cited by examiner

SYSTEMS AND METHODS FOR ANOMALY DETECTION

TECHNICAL FIELD

The present disclosure is directed towards automated systems and methods for detecting, processing, and filtering anomaly events or conditions.

BACKGROUND

This section introduces aspects that may be helpful in facilitating a better understanding of the systems and methods disclosed herein. Accordingly, the statements of this section are to be read in this light and are not to be understood or interpreted as admissions about what is or is not in the prior art.

Detection of anomalies in data is an important aspect of data analysis. An anomaly detection system can alert service providers about underlying issues in a service provider system. Most anomaly detection systems today rely on statistical approaches, which, although rigorous, cannot be easily scaled to take into account many of contextual nuances that can impact anomaly detection. As a result, conventional anomaly detection systems can be prone to report many false alerts, which ultimately lead to a significant waste of time and resources in the subsequent root cause analysis that typically follows the detection of the reported anomaly events.

BRIEF SUMMARY

The present disclosure describes systems and methods that provide a framework for augmenting statistical anomaly detection with machine learning and human Subject Matter Expert (SME) input to learn the contextual aspects of significant anomalies for which alerts should be generated. The framework presented herein is domain agnostic and independent of the underlying statistical anomaly detection technique or the machine learning algorithm. The framework described herein is therefore applicable and adaptable to a number of real world service provider systems and applications, such as, for example, detecting network performance degradation in a service provider network or detecting anomalous conditions in data received from a sensor.

In various embodiments, an anomaly detection system or method is provided for differentiating whether a reported statistical anomaly in source data from a monitored system is a true anomaly or a false anomaly. One exemplary embodiment includes determining a statistical anomaly reported in source data of a monitored system using a statistical algorithm; determining at least one intrinsic feature of the reported statistical anomaly; determining at least one extrinsic feature of the reported statistical anomaly; and, applying a machine learning model to classify the reported statistical anomaly as a true anomaly or a false anomaly using the statistical anomaly, the at least one intrinsic feature, the at least one extrinsic feature.

Some embodiments further include presenting the reported statistical anomaly to a Subject Matter Expert (SME); receiving an indication from the SME indicating whether the statistical anomaly is a true anomaly or a false anomaly; and, training the machine learning model using a machine learning algorithm to learn the characteristic features of the statistical anomaly using the at least one intrinsic feature, the at least one extrinsic feature and the indication indicating whether the statistical anomaly is a true anomaly or a false anomaly.

Some embodiments further include determining the one or more intrinsic features from within the source data or one or more parameters of the statistical algorithm used to detect the statistical anomaly.

Some embodiments further include determining the one or more extrinsic features from contextual data that is external to the source data and the one or more parameters of the statistical algorithm used to detect the statistical anomaly.

Some embodiments further include presenting the classified statistical anomaly to a Subject Matter Expert (SME); receiving a validation from the SME indicating whether the classified statistical anomaly is a true anomaly or a false anomaly; and, retraining the machine learning model to learn the characteristic features of the statistical anomaly using the at least one intrinsic feature, the at least one extrinsic feature and the validation indicating whether the classified statistical anomaly is a true anomaly or a false anomaly.

These and other embodiments will become apparent in light of the following detailed description herein, with reference to the accompanying drawings.

DETAILED DESCRIPTION

Various aspects of the disclosure are described below with reference to the accompanying drawings, in which like numbers refer to like elements throughout the description of the figures. The description and drawings merely illustrate the principles of the disclosure. It will be appreciated that those skilled in the art will be able to devise various arrangements that, although not explicitly described or shown herein, embody the principles and are included within spirit and scope of the disclosure.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

Anomaly detection is an important aspect in automated data analysis. Anomalies in general may be understood as instances of data that lie outside of a normal or expected range or threshold. A deviation of data from its normal or expected values can be indicative of an underlying problem in a service provider system. Statistical anomaly detection techniques are known, robust computational approaches that aim to statistically model a physical phenomenon and capture when data representing the physical phenomenon statistically deviates from the normal. A statistical detection system typically generates an alert that indicates an anomaly, i.e., a deviation in a data value that may be a precursor to a larger underlying issue in the service provider system. The alerts are presented to a Subject Matter Experts (SMEs) for further processing and root cause analysis. Although the conventional statistical approaches of anomaly detection can be effective in identifying and resolving a cause of a statistically detected anomalous data event, such approaches typically also give rise to a significant number of false alerts, which incur a waste of both computational and human resources.

A false alert, as used herein, is a statistical deviation in a data item that is reported as an anomaly via statistical anomaly detection because the data item is technically outside of its normal or expected range or values, but one that is nevertheless not a true anomaly indicative of a real problem in a service provider system when considered in its proper context. A number of causes can contribute to false alerts in an anomaly detection systems. Some simplistic anomaly detection systems generate alert events that are presented as anomalies to an operator of the service provider system whenever there is any statistical deviation in data from its expected or normal values. However, not every deviation from a normal or expected data values is indicative of a real problem in a monitored system. For example, an anomaly detection system that monitors network traffic may generate alerts based on sharp spikes in the traffic volume at fixed times during the day (e.g., during lunch hour). However, such spikes are often short lived and the network returns to the normal expected behavior afterwards. The generated alerts based on the spikes in the traffic volume at lunch time, although statistically significant deviations, are not truly a cause of concern to the network operators. As such, there little or no reason to raise any alerts for such events. Another example is alerts generated during a maintenance window affecting various resources of a service provider system. Such alerts, though technically valid as deviations from expected values, are not true anomalies that would be of concern to an operator of a service provider system when taking into account exigent conditions. Whether or not an anomaly reported based on a statistical deviation is a true anomaly or a false anomaly depends on context or nuances that are difficult to implement or include in an anomaly detection system that relies purely on statistical techniques.

In some known hybrid anomaly systems, a rules based engine is used alongside a statistical algorithm to suppress certain false alerts with hand-crafted rules. In other systems, the statistical algorithm is initially designed and implemented with knowledge that takes into account prior known nuances in data values. However, such methodologies carry their own weaknesses. For example, rules based solutions, whether implemented separately or integrated into a statistical algorithm, depend on human expertise with considerable domain knowledge to form the rules. Furthermore, in complex systems it is not practicable for a statistical model based approach to capture all the nuances. Yet further, in some systems, the 'knowledge' needed to reduce the false alerts lies outside of the realm of the data that the statistical algorithm can analyze. In some cases, new or unexpected contextual conditions or events may give rise to alerts that are ultimately deemed to be false, or to alerts that are missed that are true anomalies. In sum, though conventional approaches are applicable in some instances to reduce number of false positives in some cases, such approaches are complicated and not easily scalable to include important contextual information, are resource intensive and expensive to maintain, and typically require frequent manual interventions and adjustments.

Most anomaly detection techniques use one specific approach or are domain specific. The present disclosure describes systems and methods that provide an enhanced hybrid framework for mitigating or alleviating the deficiencies noted above. The hybrid framework disclosed herein is advantageous as it is iterative, scalable, and augments conventional statistical anomaly detection solutions with contextual feature detection and characterization, machine learning, and SME input to learn and report true anomalies while identifying and filtering false alerts over time.

Figure 1:
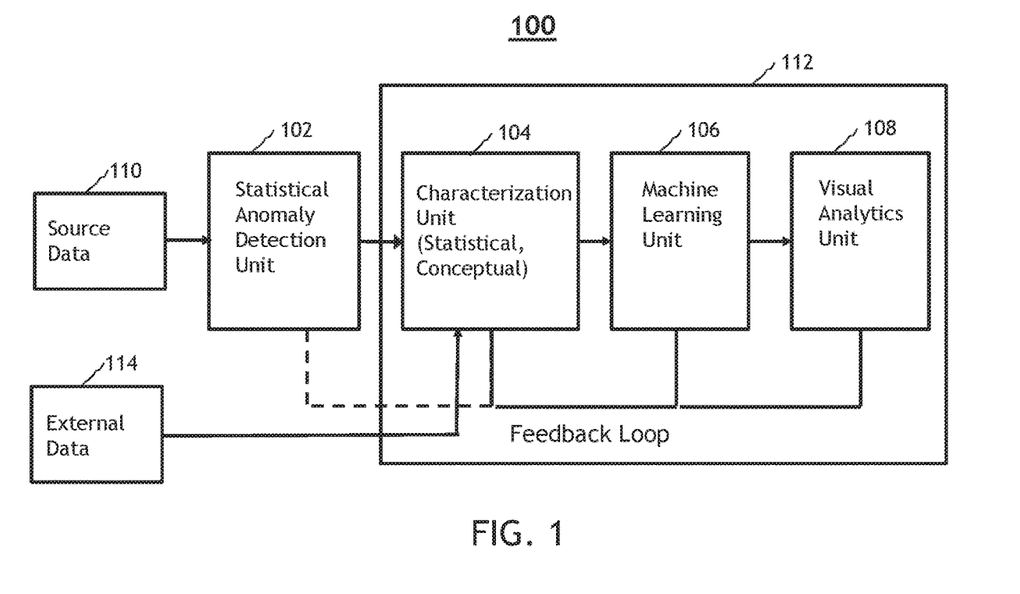
FIG. 1 illustrates an example of an anomaly detection framework in accordance with an aspect of the disclosure.

FIG. 1 illustrates a system 100 in accordance with various aspects of the disclosure. System 100 includes a statistical anomaly detection unit 102 (detection unit 102), a contextual anomaly characterization unit 104 (characterization unit), a machine learning unit 106, and a visual analytics unit 108. The detection unit 102 may be any conventional statistical anomaly detection unit configured for detecting deviations of a data item within source data 110 using a conventional statistical algorithm. The detection unit 102 may be further configured to generate an alert and report a statistical anomaly based on a deviation of a data item in the source data 110 from its normal or expected value.

The source data 110 may be any set or collection of data from a monitored system. In various aspects, the monitored system may be a service provider system and the source data may be operational data collected during operation of the service provider system over a desired period of time. For example, the source data may be Key Performance Indicator data (KPI) data from a telecommunication network, a cellular network, a packet-based network etc. The source data may be also be data (e.g., performance metric data) from of one or more devices of a security system, an audio/video system, industrial automation system, a smart home system, etc.

In various embodiments, the detection unit 102 may be implemented using a conventional parametric or a non-parametric statistical algorithm. As known in the art, parametric and non-parametric statistical analysis are some of the most common techniques for outlier detection. These statistical methods fit a statistical model to the data and then apply an inference test to detect if new data points fit the model or not. Data that has a low probability of fitting the model is considered anomalous. Parametric methods assume that the data has an underlying distribution and estimate the parameters to the model while non parametric methods do not assume any such distribution. The present disclosure is advantageously not limited to any particular method of statistical detection of deviations in the source data, and is applicable and adaptable to any suitable statistical detection method depending on the nature of the data or application. It is assumed herein that the detection unit 102 is configured to process source data 110 and to determine a statistical anomaly in the source data as a deviation in the data from its normal or expected range or values.

Collective, the characterization unit 104, the machine learning unit 106, and the visual analytics unit 108 form the framework 112 as described and discussed herein.

The characterization unit 104 is configured for processing the anomalies reported by the statistical anomaly detection unit 102 and, for each reported anomaly, determining one or more features that are relevant or potentially relevant to the reported anomaly. The one or more features may be determined using intrinsic and extrinsic data. Intrinsic features are identified and derived from intrinsic data which, in the present disclosure, includes the source data 110 and the anomaly data reported by the statistical anomaly detection unit 102. Extrinsic features are determined from extrinsic data, which in particular includes extrinsic contextual information that is determined from external data sources 114. In other words, extrinsic features are determined using an external data source 114 that includes information that is external to and not included or derivable from the source data 110, the reported anomaly, or the implementation or configuration of the detection unit 102.

Some examples of intrinsic features that may be directly derived from the source data 110 include magnitude, duration, and frequency of the reported anomalies, and statistical features like standard deviation of the various source data values during the anomaly period in which the statistical anomaly was detected or reported. In some embodiments, a first reported anomaly may also be determined as a relevant intrinsic feature of another reported anomaly that follows the first reported anomaly or vice versa. Some examples of extrinsic features that may be extracted or derived from external data 114 include contextual information such as time of day and day of the week when the anomaly occurred (external temporal context), the geographic location where the anomaly occurred (external spatial context), or the type of the anomaly, configuration parameters of the source data generating element or elements (e.g., local or global parameters governing the components of the monitored system which generated the source data). Extrinsic features may also represent any type of external events or conditions from which contextual information may be extracted, derived or correlated with respect to the reported anomaly, such as non-recurring external conditions occurring contemporaneously or near contemporaneously with the reported anomaly including, for example, system maintenance windows, weather conditions, etc.

In various embodiments, the characterization unit 104 determines the extrinsic contextual features from external data sources that are represented in FIG. 1 as the external data source 114. Some examples of external data sources from which the extrinsic contextual features are determined include, network maintenance calendars or configuration databases including system settings of the monitored systems. The characterization unit 104 generates the intrinsic and contextual (i.e., extrinsic) features that are or may be relevant to the reported anomaly event, which, as described further below, are used in combination with machine learning and SME input to learn characteristic features of true anomalies and false anomalies.

The machine learning unit 106 is configured to iteratively learn the characterizations (i.e., intrinsic and extrinsic features) associated with significant, or true anomaly events and those associated with false anomaly events, in order to, over a period of time, generate and present true anomaly alerts while filtering out false alerts. The machine learning unit 106 receives as its input data anomalies reported by the detection unit 102, the respective intrinsic features and the extrinsic features associated with the anomalies, and, feedback provided by the SME via the interactive visual analytics unit 108 as described further below. In one embodiment, the machine learning unit 106 may optionally be initially trained with sample data using conventional supervised learning methods, such as when information regarding false alerts is known a priori. Machine learning unit 106 may be configured to apply machine learning in several ways. In some embodiments, the machine learning unit 106 may be implemented as a neural network or Support Vector Machine (SVM) to learn the signatures (characterizations) of normal and anomalous data, and then to apply the learnt model to future anomalies reported by the detection unit 102. In another embodiment, the machine learning unit 106 may be configured to generate and use a C4.5 decision tree to detect reported anomalies as outliers in categorical data and then identify errors and unexpected entries in data based on such detected outliers. In other embodiments, machine learning unit 106 may be configured to implement Long Short Term Memory (LSTM) neural nets to detect patterns of unusual activity based on both the current data events and previous past data events to classify the occurrence of potential anomalies using the intrinsic and extrinsic features.

Machine learning as applied within framework 112 enables the framework to iteratively learn the relationships between the intrinsic and extrinsic features associated with the alerts generated by the detection unit 102 and, over time, enables the framework 112 to determine and filter out a greater percentage of false positives (or false anomalies) while presenting a greater percentage of true anomalies to an SME for further root cause analysis.

The interactive visual analytics unit 108 is configured to visually present on a display, information to an SME regarding the potential anomaly including information received from the detection unit 102, the characterization unit 104, and/or the machine learning unit 106. The interactive visual analytics unit 108 is further configured to receive feedback information from the SME, where the feedback information includes indication of which of the alerts representing potential anomalies shown to the SME is a true anomaly from the perspective of the SME and which is a false anomaly. The feedback received from the SME by the visual analytics unit 108, including, optionally, any additional annotations by the SME, is incorporated back into and used to further train the machine learning unit 106.

Clustering techniques may be used to group and present similar potential anomalies together so that a human subject matter expert may explore groups of related anomalies instead of individual anomalies, saving time for the expert. Discovery of correlation between the different anomalies generated by the framework 112 can advantageously provide better insights into the anomalies and can also be helpful in the visual analytics presentation. Using the annotated feedback from the expert as part of the framework 112 further enables implementing a classifier that may optionally classify and to rank anomalies shown to the SME based on their anticipated significance to the human expert.

Over time, the contextual, iterative, machine learning enhanced, and feedback based framework 112 described above has been found to significantly filter and reduce the number of false positives that are presented to the SME for root cause analysis. As described above, fewer false positives improve utilization of resources and time required to detect and process deviations in data.

Figure 2:
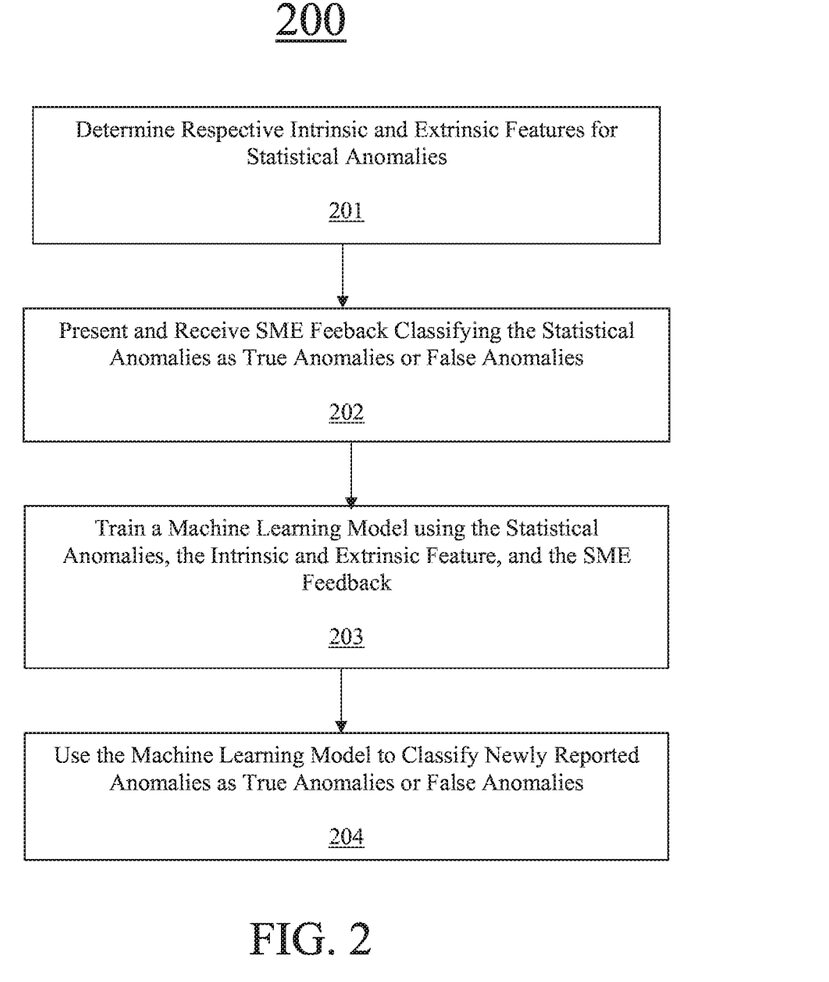
FIG. 2 illustrates an example anomaly detection and classifying process in accordance with an aspect of the disclosure.

FIG. 2 illustrates an example process 200 for implementing framework 112 of FIG. 1 in accordance with various aspects of the disclosure.

The process begins with step 201 which includes determining intrinsic and extrinsic features for characterizing a reported statistical anomaly detected in source data of a source data system. As described previously, a statistical anomaly is a deviation in a data value from its expected or normal range or value. The source data may be data from a monitored system of interest over a period of time, such that the source data may be a collection of data and may also include a number of key performance metrics that serve as an indication of the health or performance of the system.

Intrinsic features may include, for example, the duration of the anomaly, the size or magnitude of the anomaly, information regarding other anomalies that occurred in the same duration, etc. In general, intrinsic features include any relevant or contemporaneous data determined or computed from the source data itself with respect to a detected statistical anomaly, or from one or more parameters that are applied by the statistical anomaly detection unit to detect the statistical deviation using a statistical algorithm or technique.

Extrinsic features include contextual information determined from external sources. Some examples of extrinsic features include temporal, spatial, or other conditions or events that occur or were present contemporaneously with the detected anomaly. In particular, the contextual information used to determine the extrinsic features is information that is not included or determinable from the source data itself, and furthermore, is information that was not used by the detection unit 102 in detecting the anomaly using statistical means. Thus, extrinsic features represent events or conditions that may be relevant to the detected anomaly but are not directly determinable from the source data or used by the detection unit 102 to detect statistical anomalies. The determined extrinsic features may include events or conditions that occur dynamically or are non-recurring. The extrinsic features may be determined or computed from a variety of external data sources, such as global or local data obtained from one or more databases in the monitored system that provided the source data or external calendar data including maintenance and holiday/closing schedules, weather data, GPS data, public service announcement data, market data, news or market data, etc. Which extrinsic features are selected to characterize the anomaly may be determined based on the application, as will be appreciated by one of ordinary skill in the art. In general, extrinsic data, as indicated above, may be any data that which can provide contextual information regarding the statistical analysis and which is not determined from the source data itself or taken into account by the statistical anomaly detection algorithm.

In step 202, the process includes receiving SME feedback regarding the reported statistical anomalies. As described above, the reported statistical anomalies may be graphically presented to a human SME who may provide feedback as to whether the SME considers a statistical anomaly to be a true anomaly or a false anomaly from the perspective of a SME. In some aspects, the SME may not only be presented with the detected anomaly, but may optionally also be presented with additional information regarding the anomaly such as the determined intrinsic and extrinsic features. As will be understood by one of ordinary skill in the art, the display of the anomaly to the SME may include any one of many possible types of display, including, in one aspect, displaying a time varying signal of the data item which includes the data point that is regarded as the anomaly and also include pre and post data over time. The SME may be able to interact with the anomaly, by for example clicking on the anomaly using a user interface device such as a mouse or by drawing a box or a circle around it. Such action may result in displaying additional information regarding the anomaly, such as the specific time or date of the anomaly, the normal or expected value, or one or more of the intrinsic or extrinsic features.

In various aspects, the SME may provide feedback regarding the displayed anomaly using user interface devices such as a mouse or keyboard. In one exemplary embodiment, the SME feedback may be binary, indicating, for each respective statistical anomaly, whether the anomaly is a true or false anomaly. In some aspects, the SME may also provide annotations in addition to the binary feedback. For example, the SME may provide one or more keywords or phrases that are particularly relevant to the anomaly, or, the SME may identify one or more of the intrinsic or extrinsic features as an annotation to the anomaly. As a result of the step 202, the process receives indication from the SME whether each displayed anomaly is a true anomaly (true alert) that may be investigated further by the SME to identify the root cause or a false anomaly (i.e., false alert) that has been dismissed by the SME as not being an anomaly that is of concern to the SME.

In step 203, the process includes using a machine learning technique to build a learning model that learns the characteristic features (e.g., intrinsic and/or extrinsic features) of the anomalies that the SME indicates as a true anomaly versus a false anomaly. In one aspect, a separate learning model may be built for true anomalies and false anomalies. For example, one machine learning model may be built that learns the characteristic features of anomalies that the SME indicated as true anomalies. Alternatively or in addition, another learning model may be built that learns the characteristic features of anomalies that the SME indicated as false anomalies (i.e., false alerts/positives). The machine learning model (or models) is built and trained using as input the detected statistical anomalies, the determined intrinsic and extrinsic features characterizing the respective statistical anomalies, and the SME feedback indicating which of the statistical anomalies is a true anomaly and which is false anomaly or a false alert.

In step 204, the process includes using the machine learning model built in step 203 to predict and classify newly reported anomalies as true anomalies and false anomalies. For example, after a suitable or desired training period with a set or collection of source data (step 203), the machine learning model may be utilized as a classifier to predict and classify newly reported statistical anomalies as true anomalies or false anomalies based on their respectively determined intrinsic and extrinsic features. Anomalies that are predicted or classified as true anomalies may be displayed to the SME, while anomalies that are predicted or classified as false alerts or false anomalies may be filtered or suppressed.

In one aspect, the predicted classifications whether predicted or classified as true anomalies or false anomalies may be presented to the SME for further validation. The feedback provided by the SME either confirming or denying the classifications may be used to further train/refine the learning model (step 203). Such validation feedback may be iteratively and periodically received to compute an accuracy measure of the classifications and maintain it at a desired threshold. Periodically refining and validating the learning models over time may improve the classification of newly reported statistical anomaly models to generate the true alerts with a higher precision under dynamic conditions that occur over time.

Figure 3:
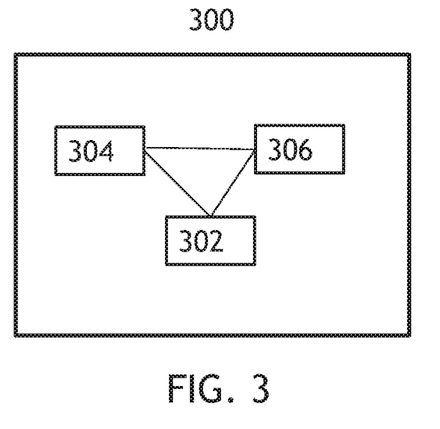
FIG. 3 illustrates an example of an apparatus for implementing various aspects of the disclosure.

FIG. 3 depicts a high-level block diagram of a computing apparatus 300 suitable for implementing various aspects of the disclosure (e.g., one or more components of framework 112/one or more steps of process 200). Although illustrated in a single block, in other embodiments the apparatus 300 may also be implemented using parallel and distributed architectures. Thus, for example, various steps such as those illustrated in the example of process 200 may be executed using apparatus 300 sequentially, in parallel, or in a different order based on particular implementations. Apparatus 300 includes a processor 302 (e.g., a central processing unit ("CPU")), that is communicatively interconnected with various input/output devices 304 and a memory 306.

The processor 302 may be any type of processor such as a general purpose central processing unit ("CPU") or a dedicated microprocessor such as an embedded microcontroller or a digital signal processor ("DSP"). The input/output devices 304 may be any peripheral device operating under the control of the processor 302 and configured to input data into or output data from the apparatus 300, such as, for example, network adapters, data ports, and various user interface devices such as a keyboard, a keypad, a mouse, or a display.

Memory 306 may be any type of memory suitable for storing electronic information, such as, for example, transitory random access memory (RAM) or non-transitory memory such as read only memory (ROM), hard disk drive memory, compact disk drive memory, optical memory, etc. The memory 306 may include data (e.g., source data 110, alert data, intrinsic/extrinsic feature data, classifier data, etc.) and instructions which, upon execution by the processor 302, may configure or cause the apparatus 300 to perform or execute the functionality or aspects described hereinabove (e.g., one or more steps of process 300). In addition, apparatus 300 may also include other components typically found in computing systems, such as an operating system, queue managers, device drivers, or one or more network protocols that are stored in memory 306 and executed by the processor 302.

While a particular embodiment of apparatus 300 is illustrated in FIG. 3, various aspects of in accordance with the present disclosure may also be implemented using one or more application specific integrated circuits (ASICs), field programmable gate arrays (FPGAs), or any other combination of hardware or software. For example, the data disclosed herein may be stored in various types of data structures (e.g., linked list) which may be accessed and manipulated by a programmable processor (e.g., CPU or FPGA) that is implemented using software, hardware, or combination thereof.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure.

The invention claimed is:

1. An anomaly detection system configured to differentiate between a true anomaly and a false anomaly in a monitored system, the anomaly detection system comprising:
   a processor configured to:
      detect a statistical anomaly reported in source data of a monitored system using a statistical algorithm;
      determine at least one intrinsic feature of the statistical anomaly;
      determine at least one extrinsic feature of the statistical anomaly, wherein the at least one extrinsic feature includes contextual information determined from at least one data source, wherein the at least one extrinsic feature includes information that is not utilized to detect the statistical anomaly;
      apply a machine learning model to classify the statistical anomaly as a true anomaly or a false anomaly using the statistical anomaly, the at least one intrinsic feature, and the at least one extrinsic feature;
      present the statistical anomaly to a Subject Matter Expert (SME);
      receive an indication from the SME indicating whether the statistical anomaly is the true anomaly or the false anomaly; and
      train the machine learning model using a machine learning algorithm to learn characteristic features of the statistical anomaly using the at least one intrinsic feature, the at least one extrinsic feature, and the indication indicating whether the statistical anomaly is the true anomaly or the false anomaly,
      wherein the contextual information comprises at least one of a maintenance schedule, a closing schedule, weather data, Global Positioning System (GPS) data, public service announcement data, market data, and news data.

2. The anomaly detection system of claim 1, wherein the processor is further configured to:
   determine the at least one intrinsic feature from within the source data or one or more parameters of the statistical algorithm used to detect the statistical anomaly.

3. The anomaly detection system of claim 2, wherein the processor is further configured to:
   determine the at least one extrinsic feature from contextual data that is external to the source data and the one or more parameters of the statistical algorithm used to detect the statistical anomaly.

4. The anomaly detection system of claim 1, wherein the processor is further configured to:
   present the classified statistical anomaly to a Subject Matter Expert (SME);
   receive a validation from the SME indicating whether the classified statistical anomaly is the true anomaly or the false anomaly; and retrain the machine learning model to learn the characteristic features of the statistical anomaly using the at least one intrinsic feature, the at least one extrinsic feature, and the validation indicating whether the classified statistical anomaly is the true anomaly or the false anomaly.

5. A computer-implemented method for differentiating between a true anomaly and a false anomaly in an anomaly detection system, the computer-implemented method comprising:
   detecting, using a processor, a statistical anomaly reported in source data of a monitored system using a statistical technique;
   determining, using the processor, at least one intrinsic feature of the statistical anomaly;
   determining, using the processor, at least one extrinsic feature of the statistical anomaly, wherein the at least one extrinsic feature includes contextual information determined from at least one data source, wherein the at least one extrinsic feature includes information that is not utilized to detect the statistical anomaly;
   executing, using the processor, a machine learning model to classify the statistical anomaly as the true anomaly or the false anomaly using the statistical anomaly, the at least one intrinsic feature, and the at least one extrinsic feature;
   presenting, on a display, the statistical anomaly to a Subject Matter Expert (SME);
   receiving, using the processor, an indication from the SME indicating whether the statistical anomaly is a the true anomaly or a the false anomaly; and training, using the processor and a machine learning algorithm, the machine learning model to learn characteristic features of the statistical anomaly using the at least one intrinsic feature, the at least one extrinsic feature, and the indication indicating whether the statistical anomaly is the true anomaly or the false anomaly, wherein the contextual information comprises at least one of a maintenance schedule, a closing schedule, weather data, Global Positioning System (GPS) data, public service announcement data, market data, and news data.

6. The computer-implemented method of claim 5, wherein the processor is further configured to:

determine the at least one intrinsic feature from within the source data or one or more parameters of the statistical technique used to detect the statistical anomaly.

7. The computer-implemented method of claim 6, wherein the processor is further configured to:

determine the at least one extrinsic feature from contextual data that is external to the source data and the one or more parameters of the statistical technique used to detect the statistical anomaly.

8. The computer-implemented method of claim 5, wherein the processor is further configured to:

present the classified statistical anomaly to the Subject Matter Expert (SME); receive a validation from the SME indicating whether the classified statistical anomaly is the true anomaly or the false anomaly; and retrain the machine learning model using the machine learning algorithm to learn the characteristic features of the statistical anomaly using the at least one intrinsic feature, the at least one extrinsic feature, and the validation indicating whether the classified statistical anomaly is the true anomaly or the false anomaly.

9. A non-transitory computer readable storage medium encoded with instructions, the instructions, when executed by a computing apparatus causes the computing apparatus to:

detect a statistical anomaly reported in source data of a monitored system using a statistical algorithm;

determine at least one intrinsic feature relevant to the statistical anomaly;

determine at least one extrinsic feature relevant to the statistical anomaly, wherein the at least one extrinsic feature includes contextual information determined from at least one data source, wherein the at least one extrinsic feature includes information that is not utilized to detect the statistical anomaly;

apply a machine learning model to classify the statistical anomaly as a true anomaly or a false anomaly using the statistical anomaly, the at least one intrinsic feature, and the at least one extrinsic feature;

present the statistical anomaly to a Subject Matter Expert (SME);

receive an indication from the SME indicating whether the statistical anomaly is the true anomaly or the false anomaly; and train the machine learning model using a machine learning algorithm to learn characteristic features of the statistical anomaly using the at least one intrinsic feature, the at least one extrinsic feature, and the indication indicating whether the statistical anomaly is a the true anomaly or the false anomaly, wherein the contextual information comprises at least one of a maintenance schedule, a closing schedule, weather data, Global Positioning System (GPS) data, public service announcement data, market data, and news data.

10. The non-transitory computer readable storage medium of claim 9, wherein the instructions when executed further cause the computing apparatus to:

determine the at least one intrinsic feature from within the source data or one or more parameters of the statistical algorithm used to detect the statistical anomaly.

11. The non-transitory computer readable storage medium of claim 10, wherein the instructions when executed further cause the computing apparatus to:

determine the at least one extrinsic feature from contextual data that is external to the source data and the one or more parameters of the statistical algorithm used to detect the statistical anomaly.

12. The non-transitory computer readable storage medium of claim 9, wherein the instructions when executed further cause the computing apparatus to:

present the classified statistical anomaly to the Subject Matter Expert (SME);

receive a validation from the SME indicating whether the classified statistical anomaly is the true anomaly or the false anomaly; and retrain the machine learning model to learn the characteristic features of the statistical anomaly using the at least one intrinsic feature, the at least one extrinsic feature, and the validation indicating whether the classified statistical anomaly is the true anomaly or the false anomaly.

13. The anomaly detection system of claim 1, wherein: the contextual information comprises the maintenance schedule.

14. The anomaly detection system of claim 1, wherein: the contextual information comprises the closing schedule.

15. The anomaly detection system of claim 1, wherein: the contextual information comprises the weather data.

16. The anomaly detection system of claim 1, wherein: the contextual information comprises the GPS data.

17. The anomaly detection system of claim 1, wherein: the contextual information comprises the public service announcement data.

18. The anomaly detection system of claim 1, wherein: the contextual information comprises the market data.

19. The anomaly detection system of claim 1, wherein: the contextual information comprises the news data.

\* \* \* \* \*